(12) United States Patent
Detering

(10) Patent No.: US 8,221,031 B2
(45) Date of Patent: Jul. 17, 2012

(54) METHOD FOR TRANSPORTING SEDIMENTS IN DAMMED BODIES OF WATER

(76) Inventor: Michael Detering, Werne (DE)

( * ) Notice: Subject to any disclaimer, the term of this patent is extended or adjusted under 35 U.S.C. 154(b) by 310 days.

(21) Appl. No.: 12/594,742

(22) PCT Filed: Mar. 28, 2008

(86) PCT No.: PCT/EP2008/002507
§ 371 (c)(1), (2), (4) Date: Oct. 5, 2009

(87) PCT Pub. No.: WO2008/122377
PCT Pub. Date: Oct. 16, 2008

(65) Prior Publication Data
US 2010/0111608 A1 May 6, 2010

(30) Foreign Application Priority Data
Apr. 4, 2007 (DE) .......................... 10 2007 016 679

(51) Int. Cl.
*E02B 8/02* (2006.01)
(52) U.S. Cl. .......................... 405/74; 37/195; 210/747.1
(58) Field of Classification Search .................. 405/74; 210/747.1; 37/195
See application file for complete search history.

(56) References Cited

U.S. PATENT DOCUMENTS

| 2,082,694 | A | 6/1937 | Foley |
| 3,964,184 | A | 6/1976 | Mathieu |
| 4,896,445 | A | 1/1990 | Deal |
| 6,817,120 | B2 * | 11/2004 | Tsuchiya et al. ............... 37/324 |
| 2004/0057839 | A1 | 3/2004 | Crawford |

FOREIGN PATENT DOCUMENTS

| DE | 417161 C | 8/1925 |
| DE | 3716274 A1 | 12/1988 |
| DE | 102004017201 A1 | 11/2005 |
| FR | 2375395 A1 | 7/1978 |
| FR | 2860532 A1 | 4/2005 |

OTHER PUBLICATIONS

Huang, Gerr sheng; Journal of North China Institute of Water Conservancy and Hydroelectric Power; Sep. 2001; pp. 5-7; vol. 22 No. 3; China Academic Journal Electronic Publishing House.

* cited by examiner

*Primary Examiner* — Tara Mayo-Pinnock
(74) *Attorney, Agent, or Firm* — Gifford, Krass, Sprinkle, Anderson & Citkowski, P.C.

(57) ABSTRACT

The invention relates a method for transporting sediments in dammed bodies of water, especially in hydraulic power plants, said sediments being deposited because there are no erosion processes as a result of the absence of a current. According to the invention, the sediment deposits are picked up in the sedimentation zone of the reservoir and are transported to the erosion zone near the discharge element/s of the reservoir such that the sediments are transported into current water by the erosion processes of the effluent water caused by the current.

13 Claims, 3 Drawing Sheets

METHOD FOR TRANSPORTING SEDIMENTS IN DAMMED BODIES OF WATER

Figure 1:
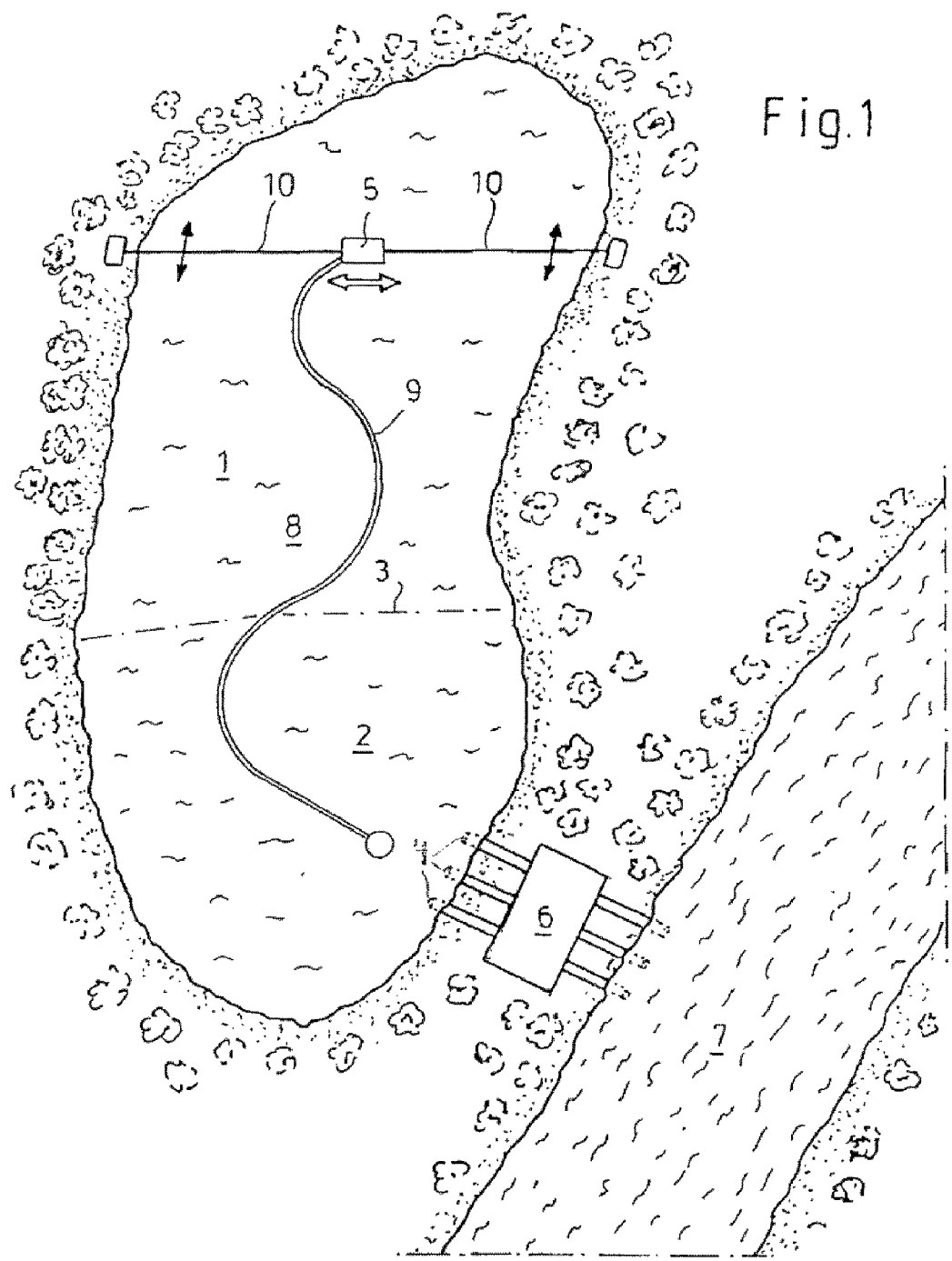

The invention relates to a method for transporting sediment deposits in dammed bodies of water, especially for hydroelectric power plants, in catchment basins and storage reservoirs or areas for power stations with reservoirs, pumped-storage power stations, and running-water power stations, weir plants, and sluices.

In addition to the flowing water, suspended matter and sediments are fundamentally important components of the morphology of bodies of flowing water. Suspended matter and sediments are found in the water of practically every river. In undisturbed bodies of flowing water, the processes of sedimentation and erosion are usually in balance. In this state, the bed of a body of water changes only slightly. However, if a body of water is dammed, then the cross section of flow and the flow rate change locally. Consequently, sediment increases at the bottom of the body of water. The same applies for the storage reservoirs of hydroelectric power plants, such as, e.g., pumped-storage power stations in which the water is stored at relative rest between the individual operating processes (pumping/turbine operation). The sediment deposited in these cases no longer erodes to the same extent, which is different from undisturbed bodies of flowing water, but instead increases in quantity over time at the bottom of the body of water and therefore reduces the usable storage volume.

Storage reservoirs, for example, for hydroelectric power plants, can be divided into two zones as a function of the generated flow rates and the associated soil shearing stress, namely into one zone of predominantly low flow rates in which sedimentation processes predominantly take place and into one zone in which higher flow rates are generated that cause erosion processes at least in some parts or at some times, for example, during the pumping operation in pumped-storage power stations. In the sense of the invention, the first zone will be called the sedimentation zone below, while the second zone will be called the erosion zone below. The boundary between the two zones will be defined as the erosion boundary.

The methods currently used for transporting sediments are essentially limited to manual removal, which is very complicated and cost-intensive. In the case of manual removal of the sediment, the removed sediment is transferred to the property of the removing company that has been paid to remove it.

Other methods known from the state of the art for transporting sediment are disclosed in, among others, the publications DE 101 09 039 A1 and DE 41 10 781 C2. Both methods describe a method for transporting sediment in which the sediment deposits are stirred up by a water jet into a heavy solution with the surrounding water and transported away by a natural and/or artificially generated current. In a storage reservoir, however, these methods would lead only to a uniform distribution of the sediment throughout the dammed body of water, where the sediment would settle out again.

The problem of the invention is to improve the already known methods for transporting sediment deposits out of dammed bodies of water to the extent that the use of the method is as simple and energy-efficient as possible.

This problem is solved according to the invention in that the sediment deposits are taken up under water and transported through means for transport into the erosion zone in the vicinity of the outflow elements of the affected storage zone, where these deposits are transported away into the downstream body of water by the erosion processes caused by the current. It is favorable if the sediment deposits are transported on the shortest path from the sedimentation zone to the vicinity of the outflow elements. Alternatively, the outflow elements can also be called flow-through elements. Advantageously, the sedimentation deposits are taken up mechanically or hydraulically and transported within the body of water into the vicinity of the outflow elements by means of a dredging or spraying method, in particular, within the storage reservoir. Advantageously, the upstream erosion zone in the region before the outflow elements is taken into consideration, that is, for example, a uniform distribution, optionally with a certain cross-sectional profile of the transported sediment, can be provided.

The term "in the vicinity" with respect to the outflow elements of the affected storage zone comprises, in the sense of the invention, in particular not the direct introduction of sediment deposits into the outflow elements or a deposition of the taken-up sediment deposits directly in front of, that is, with no spacing from, the outflow elements. This is because this arrangement would be associated with the significant disadvantage that, for example, considerable quantities of sediment deposits would be drawn in immediately when starting up a turbine for generating power, which would have a disadvantageous effect on the service life of the turbine. In addition, the location and/or spacing of the deposition of the taken-up sediment deposits is also dependent on the diameter of the provided outflow elements. Here it is true that the smaller the diameter of the outflow elements is, the closer the sediment deposits must be transported in front of these elements. It has been shown that transporting the sediment deposits up to a maximum of approximately 1 m in front of the outflow elements of an affected storage zone produces very good results also with respect to the different diameters of provided outflow elements. Preferably, the transportation of the sediment deposits takes place in a zone of at least approximately 1.5 m, further preferred, at least approximately 2 m, even further preferred, at least approximately 3 m, in front of the outflow elements of the affected storage zone. In the case of large storage-water power stations, the spacing advantageously equals at least approximately 8 m, and preferably lies in a zone from approximately 1 m to approximately 100 m, further preferred up to approximately 50 m.

The mentioned spacings for the transportation of the sediment deposits are dependent on the conditions of the temporary outflow. In addition to the diameter of the outflow or flow-through elements, the actual through flow and the properties of the water (in particular, the already present sediment concentration in the upstream water) are factors determining the impact. They influence the erosion zone or zones upstream when the closure of the outflow or flow-through elements is opened.

The spacings are defined between the opening orifice of the affected outflow elements facing the interior of the storage zone and the transported sediment deposit. The term of "transportation" used in the present invention here comprises, with respect to the sediment deposits, that these deposits could also be deposited at a distance from the outflow elements just as well as in the vicinity of these elements, and also that these deposits could also flow out through the outflow elements due to the existing current.

Through the present invention, due to the transportation of deposited sediment only into the vicinity of the outflow elements, direct mixing of the taken-up sediment with the water flowing through the outflow elements is avoided, and within the storage zone a sediment profile that rather matches a natural state is achieved. The sediment deposits are here transported out from the sedimentation zone of the dammed body of water to the erosion zone of the dammed body of water, wherein transportation into or directly onto the outflow elements of the dammed body of water is avoided, which could also lead to blockage of these elements.

Advantageously, the one or more outflow elements of the affected storage zone feature a device for generating energy, in particular, a turbine. In principle, in the sense of the present invention, it could be provided that the storage reservoir has only one outflow element, but it could also be provided that two, three, four, or even more outflow elements are provided.

For the concept of the present invention, it is also essential that the sediment deposits that are taken up from the sedimentation zone and that are transported into the vicinity of the outflow elements or even at a distance from these elements are carried away in the erosion zone by erosion processes, that is, by water. In this way, an extensive approximation of a natural, non-dammed system of bodies of water is achieved.

The method is advantageously constructed so that a certain sediment concentration is set at the outflow elements. In practice, a value between 10 mg and 100 g sediment per liter of water, advantageously between 10 mg and 10 g sediment/liter, has proven to be advantageous. Surprisingly, such turbidity of the flowing water is compatible for turbines possibly provided in the outflow elements. Purely for reasons of precaution, it could be provided according to the invention to flush the seals of the turbines by means of water of low turbidity, in order to prevent possible turbine damage. According to the hydrogeomorphology or the flow geometry of the body of water, the sediment concentration could also equal values significantly greater than 100 g of sediment per liter of water.

It is especially preferred if the sediment deposits are taken up by dredging or flushing processes and optionally transported by a suction pump. Here it is preferred if the sediment deposits are broken up by a rotary cutter before they are taken up.

For taking up the sediment, suction dredgers have proven suitable. The quantity of taken-up sediment can be set in an especially simple way by means of the output and/or the operating duration of the suction dredger.

Taking up the sediment deposits in the sedimentation zone of the storage reservoir can be automated. For the use of a suction dredger that could be constructed as a floating dredger and that could be guided on cables, it is advantageous to change the position of the suction dredger continuously and automatically by means of control cables connected to the bank. If the sediment deposits are always taken up according to the same pattern, a trench could be formed on the bottom of the body of water. Through regular or irregular changing of the pattern according to which the sediment deposits are taken up, this formation of a trench is reliably prevented.

According to the thickness of the sediment deposits in the sedimentation zone, the process can be applied intermittently or continuously, but preferably the process is operated continuously. In the sense of the invention, continuous is understood to be the continuing execution of the process during several operating cycles of the dammed body of water comprising its filling and emptying. In contrast, in the sense of the invention, intermittent is understood such that the process is performed regularly only during a special operating cycle, such as, e.g., the emptying of the storage reservoir. In addition, the process could be applied without significant interruptions during the entire period of use of the storage reservoir or only within time limits, for example, in the sense of restoration for restoring the original storage volume.

Additional advantages and details of the invention will be explained in greater detail with reference to embodiments shown in the drawings.

Figure 2:
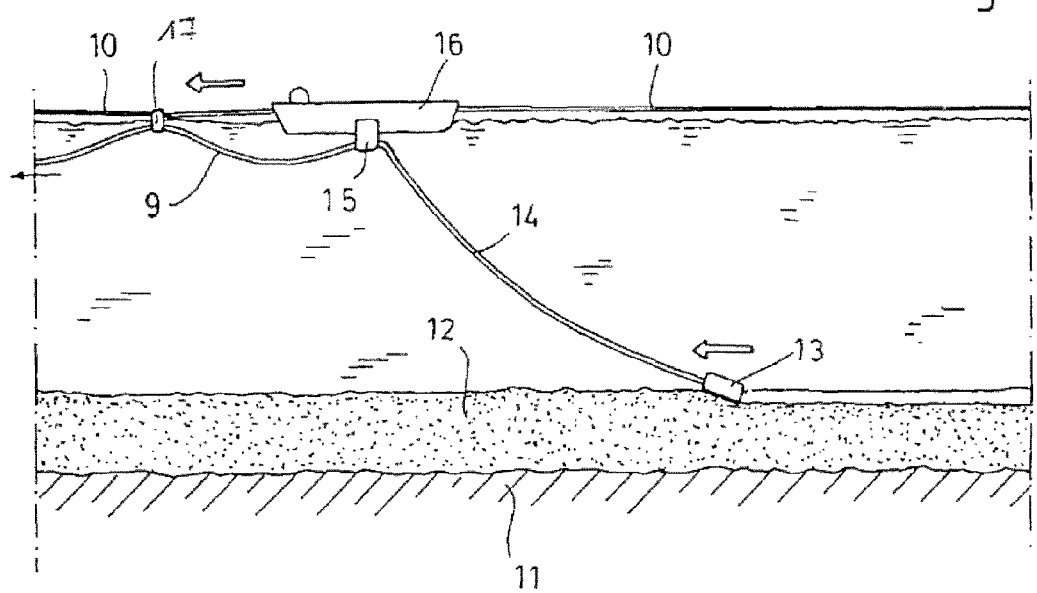
Figure 3:
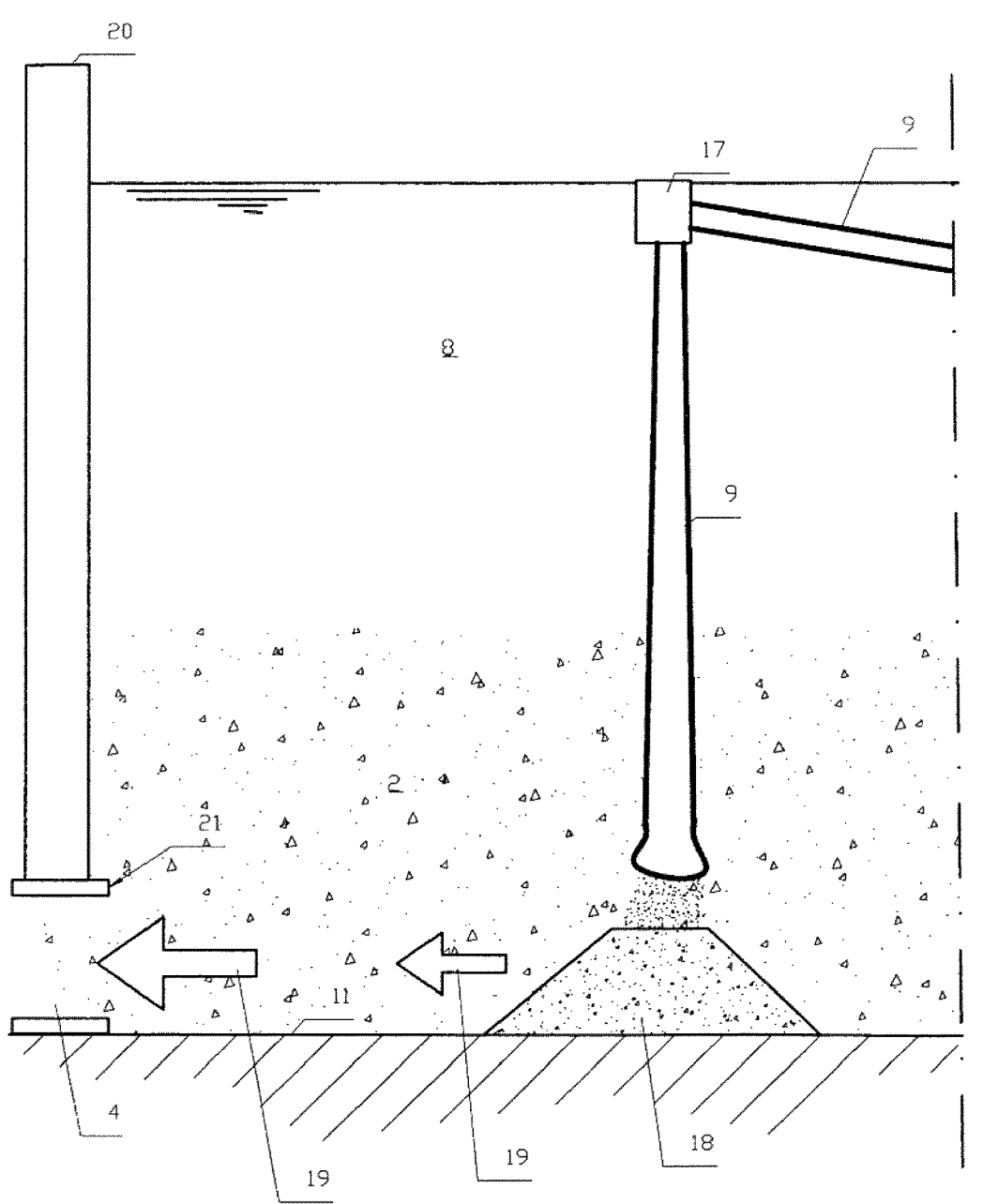

Shown are:

FIG. 1, a schematic view of a storage reservoir with a division of the storage reservoir into different erosion zones;

FIG. 2, a schematic diagram of a possibly automated taking up of the sediment deposits under water;

FIG. 3, a schematic diagram of a possible transportation of sediment deposits into the vicinity of an outflow element under water.

First it should be noted that the invention is not limited to the combinations of features shown in the figures. Instead, the features disclosed in the description, including the description of the figures, can be combined with those features specified in the figures. In addition it should be noted that the reference symbols listed in the claims should in no way limit the scope of protection of the present invention, but instead refer merely to the embodiments shown in the figures.

In FIG. 1, a schematic view of a storage reservoir 8 for a pumped-storage power station is shown. A pumped-storage power station is used for storing energy that has been generated but that is not needed at the moment. For this purpose, water is pumped by a pumped-storage power station 6 from a body of flowing water 7 into a storage reservoir 8, wherein this process is designated as the pumping operation. If the stored energy is needed, then the water is allowed to flow from the storage reservoir 8 of the pumped-storage power station 6 back into the body of flowing water 7, wherein turbines that generate energy are simultaneously driven. This process is designated as the turbine operation. During the two operating states, the pumping and turbine operations, the water in the storage reservoir 8 is in motion. And in the pauses between the operating states, the water remains at relative rest. During the pumping operation, sediment and suspended matter are also pumped with the water into the storage reservoir 8, wherein, under some circumstances, this sediment and suspended matter could settle on the bottom of the body of water due to the conditions of flow in the storage reservoir 8. With reference to the flow conditions, the storage reservoir 8 is divided into two zones. First into a sedimentation zone 1 in which more and more sediment is deposited and second into an erosion zone 2 in the vicinity of outflow elements 4 in which sediment deposits 12 are eroded and transported away during outflow processes. The boundary between these two zones is defined as the erosion boundary 3. In order to prevent a constant increase of the sediment deposits 12 in the sedimentation zone 1, according to the invention the sediment deposits 12 are transported into the erosion zone 2, from which they are transported by subsequent erosion processes. The sediment deposits 12 are taken up by a suction dredger 5 and transported by a feed pipe 9 that ends at a distance from the outflow elements 4 in the vicinity of the outflow elements 4. The entire process can also be performed automatically, wherein the suction dredger 5 is controlled, for example, by guide cables 10. The advantage of the method according to the invention is that the sediment deposits 12 are transported away from the sedimentation zone 1 without removal from the body of water.

Shown in FIG. 2, as an example, is the transportation of the sediment deposits 12 from the bottom of the body of water 11 by means of a suction dredger arrangement schematically consisting of a pump unit 15, a flushing head 13, and feed pipes 14 and 9. In order to loosen the sediment deposits 12 from the bottom of the body of water 11, the flushing head 13 is used, wherein it is preferred if the flushing head 13 comprises a rotary cutter for breaking up the sediment deposits 12. The loosened sediment is taken up by means of the pump unit 15 through the take-up line 14. The pump unit 15 is simultaneously used for the transportation of the sediment through the feed pipe 9 to the erosion zone 2. So that the method according to the invention can be performed automatically, in this example the pump unit 15 of the suction dredger arrangement is mounted on a pontoon 16. This pontoon 16 is guided by control cables 10 across the entire sedimentation zone 1 of the storage reservoir 8, whereby the suction dredger arrangement can automatically transport the sediment deposits 12 in the entire sedimentation zone 1. If the sediment deposits 12 are always taken up according to a certain pattern, this leads to the formation of a trench on the bottom of the body of water. This is prevented by regularly changing the pattern.

FIG. 3 shows the erosion zone 2 of the storage reservoir 8 with a dam 20 and an outflow element 4 arranged in this dam, wherein sediment deposits 18 transported via the feed pipe 9 kept at the water surface by floats 17 are arranged at a distance from the outflow element 4. These sediment deposits are carried away in the direction of the arrows 19 by erosion processes through the outflow element 4. The transportation of the sediment deposits 18 on the bottom of the body of water 11 is here realized, for example, at a distance of approximately 10 m from an opening orifice 21 of the outflow element 4. The end of the feed pipe can be loaded with a weight.

LIST OF REFERENCE SYMBOLS

1 Sedimentation zone
2 Erosion zone
3 Erosion boundary
4 Outflow elements
5 Suction dredger
6 Pumped-storage power station
7 Body of flowing water
8 Catchment or storage zone
9 Feed pipe
10 Control cables
11 Bottom of body of water
12 Sediment deposits
13 Flushing head
14 Take-up line
15 Pump unit
16 Pontoon
17 Float
18 Transported sediment deposit
19 Arrows
20 Dam
21 Opening orifice of outflow element 4

The invention claimed is:

1. A method for transporting sediment in dammed bodies of water, wherein this sediment is produced by deposition due to the lack of erosion processes caused by the lack of current, characterized in that sediment deposits (12) in a sedimentation zone (1) of a storage reservoir (8) are taken up and transported into an erosion zone (2) in a vicinity of an outflow element or elements (4) of the storage reservoir (8), the sedimentation zone (1) and the erosion zone (2) both being within the storage reservoir (8) and whereby the sediment is transported away to bodies of flowing water by the erosion processes caused by the current in the effluent water.

2. The method according to claim 1, characterized in that the sediment deposits (12) are taken up by dredging or flushing processes and are transported within the body of water into the vicinity of the outflow elements (4).

3. The method according to claim 1, characterized in that the quantity of sediment to be transported is selected so that, in the region of the outflow elements (4), a sediment concentration between 10 mg and 100 g of sediment for each liter of water is set.

4. The method according to claim 1, characterized in that the sediment deposits (12) in the sedimentation zone (1) of the storage reservoir (8) are taken up according to a defined pattern.

5. The method according to claim 4, characterized in that the pattern is changed regularly.

6. The method according to claim 1, characterized in that the taking-up and transportation of the sediment deposits (12) are performed automatically.

7. The method according to claim 1, characterized in that the taking-up and transportation of the sediment deposits (12) are performed intermittently.

8. The method according to claim 1, characterized in that the taking-up and transportation of the sediment deposits (12) are performed continuously.

9. The method according to claim 1, characterized in that the sediment transportation is applied during the entire period of use of the storage reservoir (8).

10. The method according to claim 1, characterized in that the sediment transportation is applied only with time limits for restoring the storage reservoir (8).

11. The method according to claim 1, characterized in that the sediment deposits (12) are taken up by a suction dredger (5).

12. The method according to claim 11, characterized in that the quantity of transported sediment is set by means of the output and/or the operating duration of the suction dredger (5).

13. The method according to claim 1, characterized in that the sediment deposits (12) are broken up with a rotary cutter before being taken up.

* * * * *